(12) United States Patent
Eskelinen et al.

(10) Patent No.: US 9,896,469 B2
(45) Date of Patent: Feb. 20, 2018

(54) METHOD FOR FRACTIONATING LIGNIN

(71) Applicant: UPM-Kymmene Corporation, Helsinki (FI)

(72) Inventors: Kati Eskelinen, Imatra (FI); Sanna Valkonen, Lappeenranta (FI); Suvi Pietarinen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/405,873

(22) PCT Filed: Jun. 5, 2013

(86) PCT No.: PCT/FI2013/050607
§ 371 (c)(1),
(2) Date: Dec. 5, 2014

(87) PCT Pub. No.: WO2013/182751
PCT Pub. Date: Dec. 12, 2013

(65) Prior Publication Data
US 2015/0183813 A1  Jul. 2, 2015

(30) Foreign Application Priority Data

Jun. 6, 2012  (FI) ..................................... 20125613

(51) Int. Cl.
*C07G 1/00* (2011.01)
*C08H 7/00* (2011.01)
*C09J 197/00* (2006.01)
*C08L 23/06* (2006.01)
*C08L 97/00* (2006.01)
*D01F 9/17* (2006.01)

(52) U.S. Cl.
CPC ............... *C07G 1/00* (2013.01); *C08H 6/00* (2013.01); *C08L 23/06* (2013.01); *C08L 97/005* (2013.01); *C09J 197/005* (2013.01); *D01F 9/17* (2013.01)

(58) Field of Classification Search
CPC .................... C07G 1/00; C08H 6/00
See application file for complete search history.

(56) References Cited

U.S. PATENT DOCUMENTS

| | | | |
|---|---|---|---|
| 4,450,106 A | 5/1984 | Forss | |
| 4,670,098 A * | 6/1987 | Thorsell | D21C 11/0042 1/42 |
| 5,202,403 A * | 4/1993 | Doering | C08G 8/38 525/54.42 |
| 5,749,926 A * | 5/1998 | Dilling | B01F 17/0057 8/524 |
| 5,777,086 A * | 7/1998 | Klyosov | C07G 1/00 530/500 |
| 6,172,204 B1 * | 1/2001 | Sarkanen | C07G 1/00 106/164.01 |
| 2002/0065400 A1 * | 5/2002 | Raskin | C07G 1/00 530/500 |
| 2010/0304141 A1 * | 12/2010 | Kamegawa | C01B 31/02 428/402 |
| 2011/0165643 A1 * | 7/2011 | Retsina | C12P 7/04 435/157 |
| 2012/0012035 A1 * | 1/2012 | Blank | C04B 24/18 106/802 |
| 2012/0174831 A1 * | 7/2012 | Hurley | C04B 28/02 106/808 |
| 2012/0329100 A1 * | 12/2012 | Uraki | C07G 1/00 435/99 |
| 2013/0143278 A1 * | 6/2013 | Tolan | C12P 19/02 435/99 |
| 2013/0183227 A1 * | 7/2013 | Wohlmann | C08H 6/00 423/447.4 |
| 2014/0242867 A1 * | 8/2014 | Jansen | C07G 1/00 442/181 |
| 2014/0329999 A1 * | 11/2014 | Friedl | B01D 61/027 530/500 |
| 2015/0087781 A1 * | 3/2015 | Valkonen | C08H 6/00 524/735 |
| 2015/0203522 A1 * | 7/2015 | Valkonen | C07G 1/00 530/500 |

FOREIGN PATENT DOCUMENTS

| | | | |
|---|---|---|---|
| EP | 0 364 632 A1 | 4/1990 | |
| JP | 62-090389 A | 4/1987 | |
| WO | WO 2012038259 A1 * | 3/2012 | ............... C08H 6/00 |
| WO | WO 2012/054947 A2 | 5/2012 | |

OTHER PUBLICATIONS

International Search Report for corresponding International Patent Application No. PCT/FI2013/050607 dated Aug. 22, 2013.
Finnish Search Report for corresponding Finnish Patent Application No. 20125613 dated Apr. 9, 2013.
Wallberg, O., et al., "Ultrafiltration of kraft black liquor with a ceramic membrane", *Desalination*, 156(1-3): 145-153 (2003).
Toledano, A. et al., "Comparative study of lignin fractionation by ultrafiltration and selective precipitation", *Chemical Engineering Journal*, 157(1): 93-99 (2010).
Schuerch, C., "The Solvent Properties of Liquids and Their Relation to the Solubility, Swelling, Isolation and Fractionation of Lignin", *Journal of the American Chemical Society*, 74(20): 5061-5067 (1952).

(Continued)

Primary Examiner — Liam J Heincer
(74) Attorney, Agent, or Firm — Nixon Peabody LLP

(57) ABSTRACT

The present invention relates to a method for fractionating lignin, wherein the method comprises the following steps: (i) dissolving lignin into a mixture containing organic solvent and water; and (ii) ultrafiltrating the mixture formed in step (i) through one or more filtration membranes for producing a predetermined number of lignin fractions, wherein each fraction contains lignin with a molecular weight within a predetermined range. The present invention further relates to a lignin fraction and to the uses thereof.

13 Claims, 4 Drawing Sheets

(56) References Cited

OTHER PUBLICATIONS

Alriols, M.G. et al., "Combined organosolv and ultrafiltration lignocellulosic biorefinery process", *Chemical Engineering Journal*, 157(1): 113-120 (2010).

European Office Action for corresponding European Patent Application No. 13732596.5 dated Jun. 28, 2016, 5 pgs.

Brodin, I. et al., "Kraft lignin as feedstock for chemical products: The effects of membrane filtration", *Holzforschung: International Journal of the Biology, Chemistry, Physics and Technology of Wood*, (2009), 63(3): 290-297.

Jönsson, A. et al., "Concentration and purification of lignin in hardwood kraft pulping liquor by ultrafiltration and nanofiltration", *Chemical Engineering Research and Design*, (2008), 86(11):1271-1280.

Nicolas Brosse, et al., "Miscanthus: a fast-growing crop for biofuels and chemicals production", 2012 Society of Chemical Industry and John Wiley & Sons, Ltd., retrieved from http://www.bioenergycenter.org/besc/publications/brosse_miscanthus_yr5.pdf.

Eero Sjöström, "Wood Chemistry: Fundamentals and Applications", 1993, excerpt, 1 page.

David N.-S. Hon, et al., "Wood and Cellulose Chemistry", Second Edition, Revised and Expanded, 2000, excerpt, 2 pages.

\* cited by examiner

1

METHOD FOR FRACTIONATING LIGNIN

This application is a National Stage Application of PCT/FI2013/050607, filed 5 Jun. 2013, which claims benefit of Ser. No. 20125613, filed 6 Jun. 2012 in Finland and which applications are incorporated herein by reference. To the extent appropriate, a claim of priority is made to each of the above disclosed applications.

FIELD OF THE INVENTION

The invention relates to a method for fractionating lignin, to a lignin fraction, and to the use thereof.

BACKGROUND OF THE INVENTION

Lignin is a natural polymer, which can be extracted from e.g. wood. As lignin is a natural biopolymer its use as a component in e.g. glues instead of synthetic materials has been investigated in order to come up with more environmentally friendly applications. Further, it has been attempted to fractionate lignin according to the molecular weight of lignin in order to come up with lignin with specific properties to be used in specific applications. For example ultrafiltration, nanofiltration and sequential precipitation have been used for fractionating lignin.

Alkaline solutions such as alkaline sodium hydroxide solutions have been used in relation to the ultrafiltration process. However, the use of an alkaline solution increases the ash content in the lignin solution. This affects the further processing of the lignin and results e.g. in need of diafiltration or of using additional sulphuric acid in order to obtain lignin fractions suitable for further processing. Thus the procedure for fractionating lignin becomes complicated and costly.

The inventors have therefore recognized a need for a more simple and effective method, which would result in fractionated lignin and especially in fractionated lignin having a reduced content of inorganic material and thus having suitable properties for use in different applications.

PURPOSE OF THE INVENTION

The purpose of the invention is to provide a new type of method for fractionating lignin. Especially the purpose is to provide lignin fractions with different molecular weights and therefore having different properties for different applications.

SUMMARY

The method according to the present invention is characterized by what is presented in claim 1.

BRIEF DESCRIPTION OF THE DRAWINGS

The accompanying drawings, which are included to provide a further understanding of the invention and constitute a part of this specification, illustrate some embodiments of the invention and together with the description helps to explain the principles of the invention. In the drawings.

DETAILED DESCRIPTION OF THE INVENTION

Figure 1:
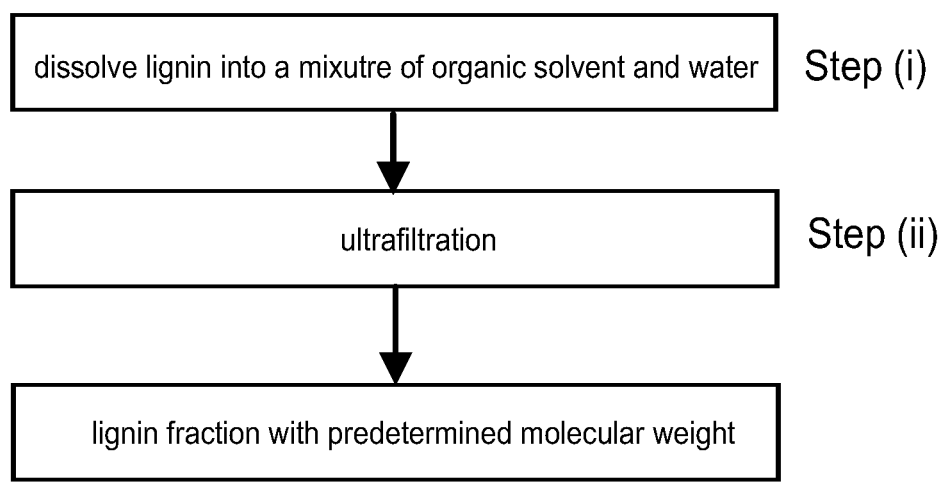
FIG. 1 is a flow chart illustration of a method according to one embodiment of the present invention.

The present invention relates to a method for fractionating lignin, wherein the method comprises the following steps:
(i) dissolving lignin into a mixture containing organic solvent and water; and
(ii) ultrafiltrating the mixture formed in step (i) through one or more filtration membranes for producing a predetermined number of lignin fractions, wherein each fraction contains lignin with a molecular weight within a predetermined range.

In this specification, unless otherwise stated, the expression "lignin" should be understood as any lignin suitable to be used in the present invention including essentially pure lignin as well as lignin derivatives and lignin modifications.

By the expression "essentially pure lignin" should be understood as at least 70% pure lignin, preferably at least 90% pure lignin. In one embodiment of the present invention the essentially pure lignin comprises at most 30%, preferably at most 10%, of other components. Inorganic matter, extractives and carbohydrates such as hemicelluloses can be mentioned as examples of such other components.

Ultrafiltration is a variety of membrane filtration in which hydrostatic pressure forces a liquid against a semipermeable membrane. A drawback of fractionating lignin by ultrafiltration has been the use of an alkaline solvent, e.g. alkaline sodium hydroxide solution, in the filtration. The alkaline solvent causes an increase in the ash content of the solution comprising dissolved lignin. The expression "ash content of lignin" or any corresponding expression should be understood in this specification, unless otherwise stated, as the content of inorganic matter in the lignin used. The increased ash content of the lignin solution has resulted in the need of further diafiltration or of using additional sulphuric acid in the further processing of the lignin fraction.

The inventors surprisingly found out that by using a mixture containing organic solvent and water, wherein the lignin is dissolved, for ultrafiltrating lignin instead of an alkaline solution the ash content of the mixture to be ultrafiltrated was not increased by the use of the solvent.

The lignin fractionated in step (ii) by the ultrafiltration treatment according to the present invention can contain impurities and/or inorganic material.

In one embodiment of the present invention the method further comprises the following step: (iii) subjecting at least one of the fractions formed in step (ii) to ion exchange treatment. The inventors surprisingly found out that by subjecting the fraction formed as a result of the ultrafiltration step to ion exchange treatment, it was possible to decrease the ash content of the lignin fraction. Step (iii) of subjecting a lignin fraction to ion exchange treatment according to the present invention enables the production of a lignin fraction having a decreased ash content compared to untreated lignin. In one embodiment of the present invention the method further comprises the following step: (iii) subjecting at least one of the fractions formed in step (ii) to ion exchange treatment for reducing the ash content of lignin. In one embodiment of the present invention an ash free lignin fraction is produced. The present invention further relates to the use of the method according to the present invention for reducing the content of inorganic components in lignin.

Ion exchange is a procedure wherein ions can be exchanged between two electrolytes or between an electrolyte solution and a complex. In one embodiment of the present invention the ion exchange treatment comprises the use of one or more ion exchange resins. In one embodiment of the present invention the ion exchange resin comprises a cation exchange resin, an anion exchange resin or an ampho-teric exchange resin. The cation exchange resin exchange positively charged ions (cations), the anion exchange resin exchange negatively charged ions (anions), and the ampho-teric exchange resin is able to exchange both cations and anions simultaneously. In embodiment of the present inven-tion the ion exchange treatment comprises the use mixed beds that contain a mixture of anion and cation exchange resins. In one embodiment of the present invention step (iii) comprises the use of one or more different ion exchange resins. According to one embodiment of the present inven-tion step (iii) comprises the use of cation and anion exchange resins by turns.

In one embodiment of the present invention the method comprises the step of diluting at least one of the fractions obtained from step (ii) before step (iii). In one embodiment of the present invention at least one fraction is diluted with water.

In one embodiment of the present invention step (iii) is carried out at a temperature of 20-80° C.

In one embodiment of the present invention the method further comprises the following step: (iv) removing the organic solvent from at least one of the fractions obtained from step (ii) or obtained from step (iii) for precipitating lignin. In one embodiment of the present invention the lignin is precipitated in the water phase of the mixture. In one embodiment of the present invention step (iv) comprises evaporating the organic solvent.

In one embodiment of the present invention the method comprises decreasing the temperature to room temperature before, during and/or after step (iv). Decreasing the tem-perature to room temperature may have advantageous effects on the precipitation of lignin. The expression "room tem-perature" should be understood in this specification, unless otherwise stated, as a temperature of 20-25° C.

In one embodiment of the present invention the method further comprises the following step: (v) filtrating the pre-cipitated lignin.

In one embodiment of the present invention 10-100 weight-%, preferably 30-90 weight-% of the lignin is dis-solved in the mixture containing organic solvent and water.

In one embodiment of the present invention step (i) is performed at a temperature of 20-120° C., preferably at a temperature of 20-90° C., and more preferably at a tempera-ture of 50-70° C.

In one embodiment of the present invention lignin is dissolved into a mixture of organic solvent and water in step (i). In one embodiment of the present invention lignin is dissolved into a mixture consisting of organic solvent and water in step (i).

In one embodiment of the present invention the mixture containing organic solvent and water comprises 30-70 weight-%, preferably 45-55 weight-% of organic solvent.

In one embodiment of the present invention the organic solvent is selected from a group consisting of acetone, acetonitrile, butylacetate, dimethyl sulfoxide (DMSO), dim-ethylformamide (DMF), tetrahydrofuran (THF), propylene carbonate, ethanol, isopropanol, n-propanol, n-butanol, and any combination thereof. In one embodiment of the present invention the organic solvent is an alcohol.

In one embodiment of the present invention step (ii) comprises preventing evaporation of the organic solvent during ultrafiltration.

In one embodiment of the present invention step (ii) comprises refluxing organic solvent evaporated during ultra-filtration.

In one embodiment of the present invention the filtration membrane is a ceramic membrane or a polymer membrane.

In one embodiment of the present invention two or more filtration membranes having different cut-off values are used in step (ii).

In one embodiment of the present invention step (ii) comprises passing the mixture formed in step (i) through two or more filtration membranes arranged one after the other such that the cut-off value of the preceding filtration membrane is higher than the cut-off value of the following filtration membrane.

The number of the filtration membranes used in step (ii) can be selected based on the desired number of lignin fractions to be formed. The cut-off values of the filtration membranes used in the step (ii) can be selected based on which kind of lignin fractions are to be formed. I.e. the cut-off values can be selected based on the ranges of the molecular weight of the produced lignin fractions one wish to obtain.

In one embodiment of the present invention step (ii) of ultrafiltration is continued until a desired volume reduction factor (VRF) is achieved.

In one embodiment of the present invention the lignin to be fractionated is selected from a group consisting of kraft lignin, biomass originating lignin, lignin from alkaline pulp-ing process, lignin from soda process, lignin from organo-sols pulping, chemically modified lignin, and any combina-tion thereof.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distri-bution of lignin fraction precipitated at a lower pH value is wider than of lignin fraction precipitated at a higher pH value.

In one embodiment of the present invention the dry matter content of the lignin is below 98%, preferably 40-80%, and more preferably 50-70%.

In one embodiment of the present invention the lignin is separated from pure biomass. The separation process can begin with liquidizing the biomass with strong alkali fol-lowed by a neutralization process. After the alkali treatment the lignin can be precipitated in a similar manner as pre-sented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further process-ing.

The method of the present invention results in fractions of lignin with different molecular weights and properties being formed. Thus, by the method according to the present invention it is possible to produce fractions of lignin with specific properties for specific applications. E.g. in some application lignin of low molecular weight being more reactive is more favorable to be used while in other applications lignin of high molecular weight results in better properties of the final product. As an example it can be mentioned that using both low molecular weight lignin and high molecular weight lignin in the production of a binder composition results in advantageous binder properties.

Using ultrafiltration together with the ion exchange treatment in accordance with the present invention surprisingly results in the formation of fractionated lignin with reduced ash content. Without limiting the invention to any specific theory about why the method of the present inventions results in the aforementioned advantage, it is to be considered that the use of the organic solvent during the ultrafiltration step ensures that said step does not increase the ash content of the mixture or fraction to a level, which would be too high in order to the ion exchange step to be performed for said mixture or fraction. The use of ultrafiltration and ion exchange in accordance with the present invention thus surprisingly enables the production of so-called ash-free lignin, i.e. lignin having a reduced content of inorganic material.

The present invention further relates to a lignin fraction comprising lignin with a molecular weight within a predetermined range obtainable by the method according to the present invention.

The lignin fractions formed by the method according to the present invention may have different properties. E.g. the solubility, polarity, Tg value, melting point, purity level, molecular weight, reactivity or the functional groups may vary between the fractions formed. Depending on the specific properties of the formed lignin fractions, they can be used in different applications. In one embodiment of the present invention a lignin fraction is used as a thermoset or a thermoplastic additive, as a filler for plastics, as a precursor for carbon fiber, as an additive for polyolefins, as a dispersant, as a surfactant, as a fire-retardant, or for the production of a cross-linking or a coupling agent.

The present invention further relates to the use of the lignin fraction according to the present invention for the production of a binder composition or an adhesive composition.

The present invention further relates to the use of the lignin fraction according to the present invention for the production of carbon fiber.

The present invention further relates to the use of the lignin fraction according to the present invention as an additive for thermoset plastic or thermoplastic.

The formed lignin fractions can be chemically modified to produce lignin with desired properties. The chemically modified lignin can be used in the applications mentioned above.

One or more lignin fractions produced by the method according to the present invention can be used together with e.g. a polymerizable substance, cross-linking agent, and a catalyst for producing a binder composition. The produced binder composition can be used as a part of an adhesive composition together with one or more adhesive components selected from a group consisting of other binders, extenders, additives, catalysts and fillers.

The binder composition and/or the adhesive composition can be used for gluing applications. E.g. a layered composite structure can be formed of two or more layers including at least one wood veneer layer, wherein the layers are arranged the one above the other and combined by means of gluing with the binder composition and/or the adhesive composition. In this specification, unless otherwise stated, the term "wood veneer" is used to address a veneer, which can be formed of any material, e.g. wood-based material, fiber material, composite material or the like. In this context, the thickness of the wood veneer can be varied. Typically the thickness of wood veneer is below 3 mm.

The layered composite structure can be selected from a group consisting of a wood panel product, a plywood product, a composite product, and a pressed panel product. The layered composite structure can be formed of a number of layers, preferably wood veneer layers, in which the layers are laid one upon the other and glued together. The layered composite structure can also be formed of a number of paper or fiber mat layers.

The formed adhesive composition can be used for gluing a wood product. The wood product can be selected from a group consisting of a wood board, a wood veneer, and a wood bar.

The embodiments of the invention described hereinbefore may be used in any combination with each other. Several of the embodiments may be combined together to form a further embodiment of the invention. A method, a fraction or a use, to which the invention is related, may comprise at least one of the embodiments of the invention described hereinbefore.

An advantage of the method according to the present invention is that by using a mixture containing organic solvent and water it is possible to dissolve almost 100% of a lignin sample to be used for the fractionation procedure into the mixture to be ultrafiltrated. An advantage of the organic solvent is that the content of inorganic material in the lignin mixture is not increased due to the used solvent. This has advantageous effects of e.g. reducing the number of method steps or materials needed for fractionating and purifying lignin, thus simplifying the overall procedure and decreasing the costs involved.

An advantage of using ultrafiltration together with ion exchange in accordance with the present invention is that lignin fractions having reduced ash content can be produced.

An advantage of the lignin treated in accordance with the method of the present invention is its better suitability in chemical syntheses such as in polymerizing reactions compared to untreated lignin.

An advantage of the method according to the present invention is that it results in purified lignin fractions with predetermined molecular weight ranges. The method according to the present invention results in fractions of lignin having different molecular weight and properties such as reactivity. An advantage of the present invention is that lignin fractions produced by the method according to the present invention and having specific properties can be selected based on these properties for specific applications.

EXAMPLES

Reference will now be made in detail to the embodiments of the present invention, examples of which are illustrated in the accompanying drawings.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for producing a predetermined number of lignin fractions with different molecular weight ranges.

Before dissolving lignin into a mixture containing organic solvent and water, the source and amounts of the components are chosen. Especially the source of the lignin to be fractionated is selected.

Following various preparations, step (i) is carried out by dissolving the selected lignin into a mixture containing organic solvent and water. The mixture can comprise e.g. a 50 weight-% acetone water mixture. The step (i) of dissolving lignin can be carried out at a temperature of e.g. 20-60° C.

When about 98 weight-% of the lignin has been dissolved into the mixture containing organic solvent and water, step (ii) is carried out. In step (ii) the formed mixture is passed through a predetermined number of filtration membranes in an ultrafiltration process. The formed mixture can be passed through a predetermined number of filtration membranes being arranged one after the other such that the cut-off value of the preceding filtration membrane is higher than the cut-off value of the following filtration membrane.

As a result of step (i), and step (ii), different lignin fractions, each of which comprises lignin having a molecular weight within a predetermined range, are produced. These lignin fractions can be further processed in a desired manner to be used in different applications.

Figure 2:
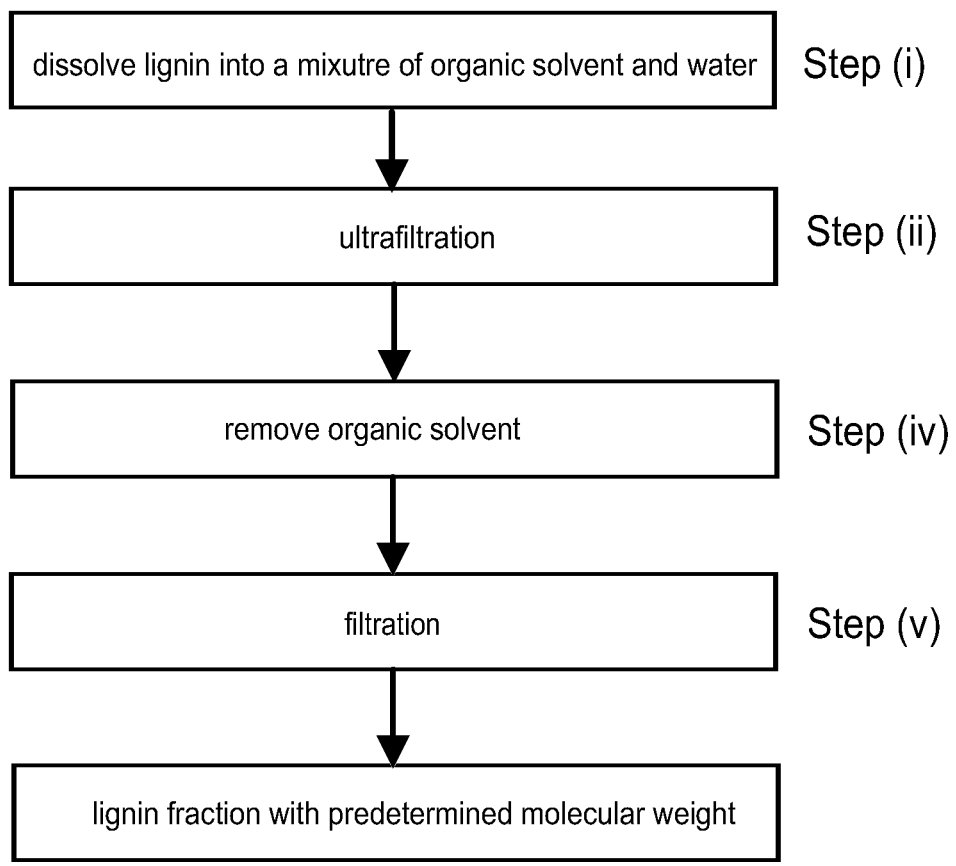
FIG. 2 is a flow chart illustration of a method according to another embodiment of the present invention.

FIG. 2 illustrates a method according to another embodiment of the present invention for fractionating lignin.

The method according to the embodiment of FIG. 2 begins in a similar manner as in the embodiment of FIG. 1. I.e. the selected lignin is dissolved in step (i) into a mixture containing organic solvent and water, after which it is ultrafiltrated in step (ii) in a manner as discussed above in relation to FIG. 1.

Following step (ii) of subjecting the mixture from step (i) to ultrafiltration treatment, the organic solvent used is removed, e.g. by evaporation, from each of the different lignin fractions formed. During the evaporation, the lignin is precipitated. The precipitated lignin can then be filtrated from the solution in step (v) by using e.g. a pressure or a vacuum filter.

As a result of step (i), step (ii), step (iv), and step (v) a predetermined number of lignin fractions, each of which comprises lignin having a molecular weight within a predetermined range, are produced. These lignin fractions can be further used for different applications.

Figure 3:
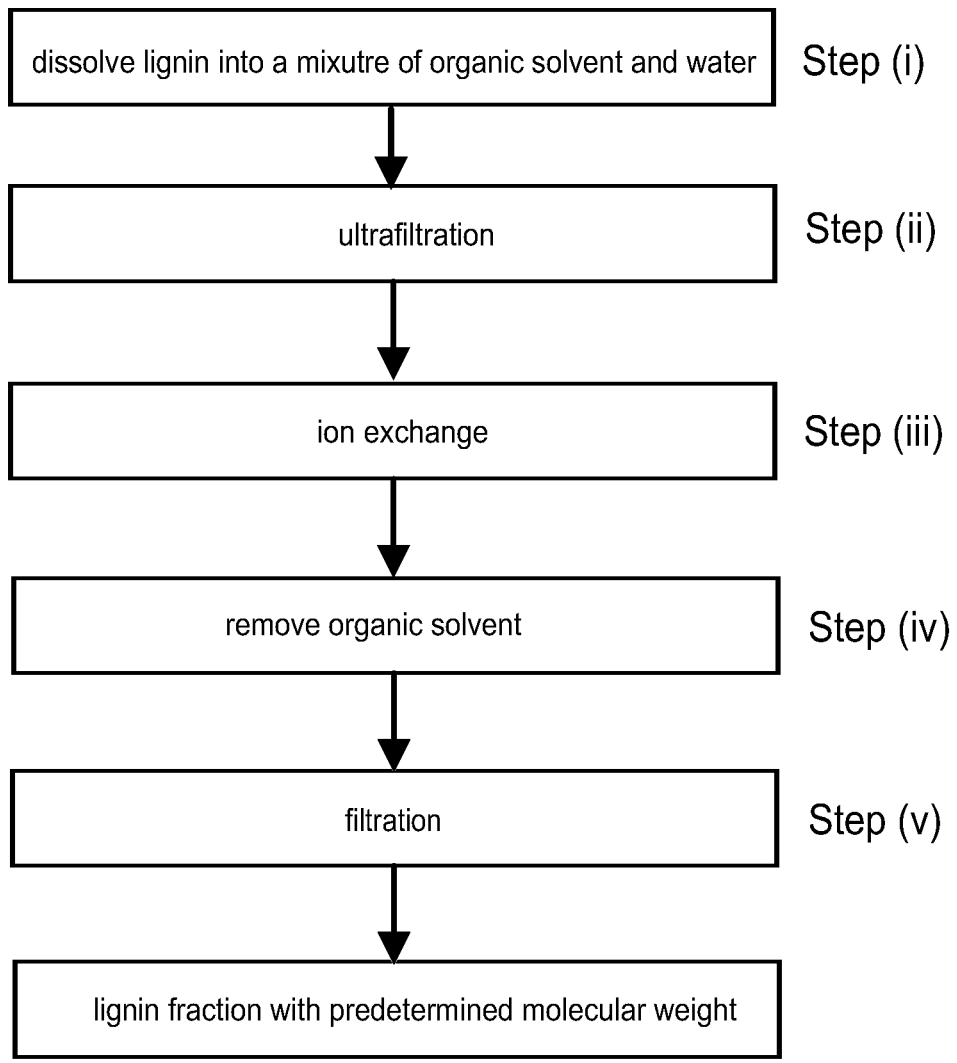
FIG. 3 is a flow chart illustration of a method according to still another embodiment of the present invention.

FIG. 3 illustrates a method according to still another embodiment of the present invention for fractionating lignin.

The method according to the embodiment of FIG. 3 begins in a similar manner as in the embodiment of FIG. 1. I.e. the selected lignin is dissolved in step (i) into a mixture containing organic solvent and water, after which it is ultrafiltrated in step (ii) as discussed above in relation to FIG. 1.

Following step (ii) of subjecting the mixture from step (i) to ultrafiltration treatment, step (iii) is carried out. Step (iii) comprises subjecting at least one of the fractions formed in step (ii) to ion exchange treatment for decreasing the content of inorganic material in lignin. Prior to subjecting said fractions to the ion exchange treatment they can be diluted, if needed, after which they are treated by cation and anion exchange resins. The ion exchange treatment is carried out at a temperature of 20-80° C.

Then, step (iv) is carried out, i.e. the residual organic solvent is removed, e.g. by evaporation, from the treated lignin fractions. During the evaporation, lignin starts to precipitate. The precipitated lignin can then be filtrated from the solution in step (v).

As a result of step (i), step (ii), step (iii), step (iv), and step (v) different lignin fractions, each of which comprises lignin with a molecular weight within a predetermined range, are produced. Especially, as a result of the method according to the embodiment of FIG. 3. lignin with a reduced ash content or content of inorganic material is formed. These lignin fractions can be further used for different applications.

Figure 4:
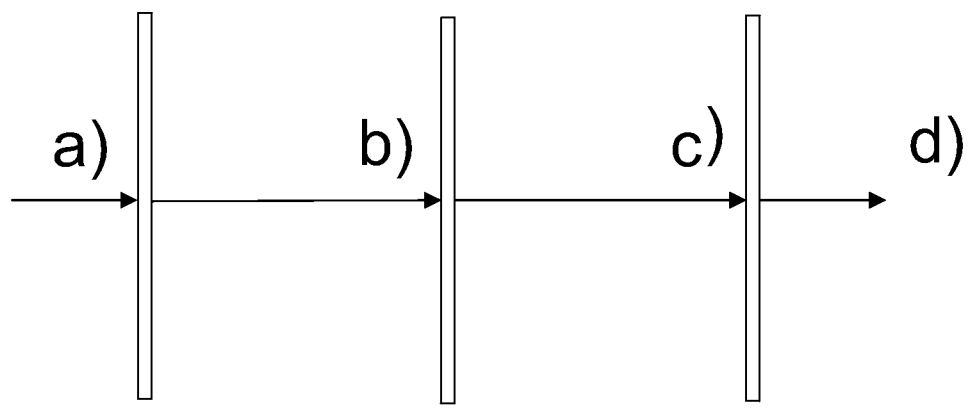
FIG. 4 is a schematical illustration of one embodiment of the ultrafiltration step according to the present invention.

The ultrafiltration step of the method according to one embodiment of the present invention can be realized in a manner as illustrated schemtically in FIG. 4. In this embodiment of the present invention an ultrafiltration step with three filtration membranes is illustrated. In step (ii) of ultrafiltrating the mixture, obtained from step (i), comprising dissolved lignin is firstly passed through a first filtration membrane having a cut-off value of 50 kDa, whereby a concentrate a) and a permeate b) is formed. The permeate b) is then passed through a filtration membrane of 15 kDa, whereby a permeate c) is formed. Finally, the permeate c) is passed through a filtration membrane of 5 kDa, whereby a permeate d) is formed. Thus, as a result of the ultrafiltration step four lignin fractions are formed. Each of these fractions comprises lignin within a specific molecular weight range and having specific properties.

Example 1

Fractionating Lignin

In this example lignin was fractionated in accordance with the embodiment presented in FIG. 2. The following components and their amounts were used:

|  | amount (kg) |
| --- | --- |
| water | 50 |
| acetone | 50 |
| lignin | 10 |

Firstly, a mixture containing acetone and water was formed such that the acetone concentration was 50 weight-%. The lignin was then dissolved into the mixture having a temperature of 60° C. 98% of the lignin was dissolved into the mixture containing acetone and water.

Then, the formed mixture was ultrafiltrated by feeding the mixture through three successive ceramic membranes having cut-off values of 50 kDa, 15 kDa and 5 kDa, respectively, in a manner as illustrated in FIG. 4. The membranes having cut-off values of 50 kDa and 5 kDa were Tami Industries' Filtanium™ membranes and the membrane having a cut-off value of 15 kDa was an Inside CéRAM™ ceramic membrane. Evaporation of the acetone during the filtration procedure was prevented by sealing the filtration equipment. The acetone that nevertheless was being evaporated was refluxed such that the increase of pressure was prevented.

In the ultrafiltration step the permeate from the 50 kDa filtration membrane was used as a feed in the 15 kDa filtration membrane and similarly the permeate from the 15 kDa filtration membrane was used as a feed in the 5 kDa filtration membrane. This set of filtration membranes resulted in the formation of four different lignin fractions, i.e. the concentrate from the 50 kDa membrane, in the concentrate from the 15 kDa membrane, in the concentrate from the 5 kDa membrane, and in the permeate from the 5 kDa membrane.

After the ultrafiltration procedure, acetone was evaporated from each of these four fractions resulting in lignin being precipitated in the water phase. Finally, the precipitated lignin was recovered by filtration using a vacuum filter.

The procedure of example 1 resulted in the formation of four lignin fractions with different molecular weights.

Example 2

Producing Ash Free Lignin Fractions

In this example ash free lignin fractions were produced in accordance with the embodiment presented in FIG. 3. The following components and their amounts were used:

|  | amount (kg) |
| --- | --- |
| water | 25 |
| ethanol | 75 |
| lignin | 10 |

Firstly, a mixture containing ethanol and water was formed such that the ethanol concentration was 50 weight-%. The lignin was then dissolved into the mixture having a temperature of 65° C. 98% of the lignin was dissolved into the mixture containing ethanol and water.

Then, the formed mixture was ultrafiltrated by feeding the mixture through two successive polymeric membranes having the following cut-off values: 100 kDa, and 30 kDa. The ultrafiltration was performed with polymeric membranes purchased from Microdyn Nadir. Evaporation of the ethanol during the filtration procedure was prevented by sealing the filtration equipment. The ethanol that despite sealing the equipment was still being evaporated was refluxed such that an increase in pressure was prevented.

The permeate from the 100 kDa filtration membrane was used as a feed in the 30 kDa filtration membrane. This set of filtration membranes resulted in the formation of three different lignin fractions, i.e. the concentrate from the 100 kDa filtration membrane, in the concentrate from the 30 kDa filtration membrane, and in the permeate of the 30 kDa filtration membrane.

After the ultrafiltration procedure, each of the formed lignin fractions was subjected to an ion exchange procedure by using Finex's resin. The lignin fractions were diluted with water before being subjected to said procedure. The ion exchange procedure resulted in inorganic material being removed from the lignin. I.e. so-called ash-free lignin was formed.

Thereafter, residual ethanol was evaporated from each of the lignin fractions resulting in the lignin being precipitated. The lignin solution was cooled to room temperature and the precipitated lignin was filtrated from the solution by using a pressure filter.

The procedure of example 2 resulted in the formation of three lignin fractions with different molecular weights being formed. Especially, the procedure of example 2 resulted in the formation of so-called ash-free lignin, which can advantageously be used in different applications.

Example 3

The Use of Different Lignin Fractions in the Production of a Binder Composition

In this example a binder composition was produced using the lignin fractionated in accordance with example 1. The following components and their amounts were used:

|  | concentration | amount (g) |
| --- | --- | --- |
| water |  | 179 |
| NaOH-I | 50% | 102 |
| HMW-lignin fraction | 97% | 146 |
| LMW-lignin fraction | 97% | 72 |
| phenol (polymerizable substance) | 90% | 123 |
| formaldehyde (crosslinkingagent) | 40% | 370 |
| NaOH-II | 50% | 51 |

The HMW-lignin fraction (high molecular weight lignin fraction) comprised lignin from the concentrate from the 50 kDa membrane of the ultrafiltration step. The LMW-lignin fraction (low molecular weight lignin fraction) comprised lignin from the permeate of the 5 kDa membrane of the ultrafiltration step.

Firstly, water, the first part of NaOH (NaOH-I) and HMW-lignin were mixed under heating such that a dispersion was formed. Then the temperature was adjusted to 50° C., the phenol was added and then the formaldehyde was added in a stepwise manner during a period of one hour. The temperature was kept under 75° C. After the formaldehyde had been added the second part of the NaOH (NaOH-II) was added. After the addition of NaOH-II, the composition was cooked at 75° C. until the viscosity of the composition was 100 cP. Then the LMW-lignin was added to the composition. The cooking was continued at the temperature of 75° C. until the viscosity of the formed composition was about 305 cP. Then the composition was cooled resulting in a final viscosity of 350 cP. The viscosity was measured at a temperature of 25° C.

In this example, phenol and formaldehyde are used are used as examples of polymerizable substance and crosslinking agent, respectively. However, any other polymerizable substance or crosslinking agent can be equally well used in the binder composition production method. The polymerizable substance can be selected e.g. from a group consisting of phenol, cresol, resorcinol and combinations thereof, bio-based hydroxyphenols and their derivatives, lignin and tannin. The crosslinking agent can be selected e.g. from a group consisting of an aldehyde, a derivative of an aldehyde, an aldehyde forming compound and combinations thereof. The crosslinking agent can be selected e.g. from a group consisting of formaldehyde, hexamethylenetetramine, paraformaldehyde, trioxane, aromatic aldehyde, glyoxal, furfuryl alcohol, caprolactam, glycol compounds and any combinations thereof. The aromatic aldehyde can be furfuryl aldehyde.

Example 4

Preparing an Adhesive Composition

In this example the binder composition produced in Example 3 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition.

Example 5

Preparing Carbon Fiber

In this example the lignin fraction from the concentrate of the 15 kDa membrane from Example 1 was melt spinned to carbon fiber at a temperature of 20-95° C. above the Tg of the lignin fraction by HAAKE MiniLab II CTW5 and collected on a bobbin (TUS) in a manner as described in "Ida Nordberg, Carbon fibers from kraft lignin, Doctoral Thesis, 2012".

Example 6

The Use of a Lignin Fraction as an Additive in Thermoplastics

In this example 30 weight-% of the lignin obtained from the concentrate of the 5 kDa membrane from Example 1 was mixed with 70 weight-% of low-density polyethylene (LDPE) (LD152BW ExxonMobile/Dupont) by a double screw mixer (DSM Xplore micro mixer and extruder) at a temperature of 160° C. and then injection molded.

Example 7

The Use of a Lignin Fraction as an Additive in Thermoplastics

In this example 30 weight-% of lignin obtained from the concentrate of the 5 kDa membrane from Example 1 was mixed with 10 weight-% of maleate grafted polyethylene (PE) (Fusabond E226) and 60 weight-% of LDPE (LD152BW ExxonMobile/Dupont) by a double screw mixer (DSM Xplore micro mixer and extruder) at a temperature of 160° C. and then injection molded.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for fractionating lignin, wherein the method comprises the following steps:
  (i) dissolving lignin into a mixture including organic solvent and water, wherein step (i) is performed at a temperature of 50-120° C., wherein the lignin is a wood-based lignin, wherein the wood-based lignin includes kraft lignin derived from black liquor, lignin from an alkaline pulping process, lignin from a soda process, or any combination thereof;
  (ii) ultrafiltrating the mixture formed in step (i) through one or more filtration membranes for producing a predetermined number of lignin fractions, wherein each fraction includes lignin with a molecular weight within a predetermined range; and
  (iii) subjecting at least one of the lignin fractions formed in step (ii) to ion exchange treatment.

2. The method according to claim 1, wherein the method further comprises the following step:
  (iv) removing the organic solvent from at least one of the fractions obtained from step (ii) or obtained from step (iii) for precipitating lignin.

3. The method according to claim 2, wherein the method further comprises the following step:
  (v) filtrating the precipitated lignin.

4. The method according to claim 1, wherein 10-100 weight-%, preferably 30-90 weight-% of the lignin is dissolved in the mixture including organic solvent and water.

5. The method according to claim 1, wherein step (i) is performed at a temperature of 50-90° C.

6. The method according to claim 1, wherein the organic solvent is selected from a group consisting of acetone, acetonitrile, butylacetate, dimethyl sulfoxide, dimethylformamide, tetrahydrofuran, propylene carbonate, ethanol, isopropanol, n-propanol, n-butanol, and any combination thereof.

7. The method according to claim 1, wherein step (ii) comprises preventing evaporation of the organic solvent during ultrafiltration.

8. The method according to claim 1, wherein the filtration membrane is a ceramic membrane or a polymer membrane.

9. The method according to claim 1, wherein two or more filtration membranes having different cut-off values are used in step (ii).

10. The method according to claim 1, wherein step (ii) comprises passing the mixture formed in step (i) through two or more filtration membranes arranged one after the other such that the cut-off value of the preceding filtration membrane is higher than the cut-off value of the following filtration membrane.

11. The method according to claim 1, wherein step (i) is performed at a temperature of 50-70° C.

12. The method according to claim 1, wherein method does not result in an increase in ash content.

13. The method of claim 1, wherein the wood-based lignin is kraft lignin, biomass originating lignin, lignin from alkaline pulping process, lignin from soda process, lignin from organosolv pulping, chemically modified lignin, or any combination thereof.

* * * * *